United States Patent [19]

Matsumoto

[11] Patent Number: 4,779,257
[45] Date of Patent: Oct. 18, 1988

[54] DISC DRIVING DEVICE
[75] Inventor: Yukio Matsumoto, Furukawa, Japan
[73] Assignee: Alps Electric Co., Ltd., Japan
[21] Appl. No.: 4,151
[22] Filed: Jan. 15, 1987
[30] Foreign Application Priority Data
Mar. 12, 1986 [JP] Japan .................. 61-52356
[51] Int. Cl.$^4$ ............................................ G11B 17/04
[52] U.S. Cl. ................................................. 369/75.2
[58] Field of Search .................. 369/75.2, 77.2, 265, 369/270, 77.1

[56] References Cited

U.S. PATENT DOCUMENTS 4,564,930  1/1986  Funabashi et al. ............... 369/75.2
4,625,304 11/1986  Kanamaru et al. .............. 369/75.2
4,641,297  2/1987  Watanabe ......................... 369/75.2
4,672,598  6/1987  Koken et al. ..................... 369/75.2

Primary Examiner—David Werner
Attorney, Agent, or Firm—Guy W. Shoup; Paul J. Winters

[57] ABSTRACT

A disc driving device for recording and or reproducing information by rotating an information recording medium in the form of a disc. The device comprises a turntable for rotating the medium, a support member for supporting the turntable, a tray for placing the medium thereon, a chassis provided with a groove and supporting the tray, tray driving means provided with a gear train, a slide plate provided with a cam groove and supporting the support member, drive means for reciprocating the slide plate, and a clamper rotatably provided opposedly of the turntable.

7 Claims, 18 Drawing Sheets

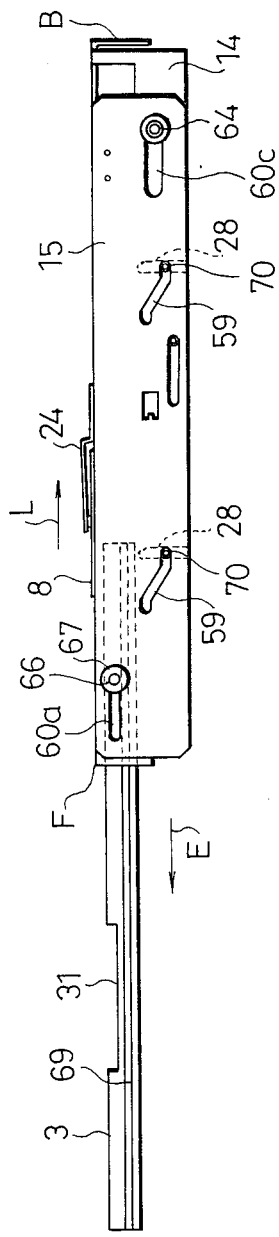
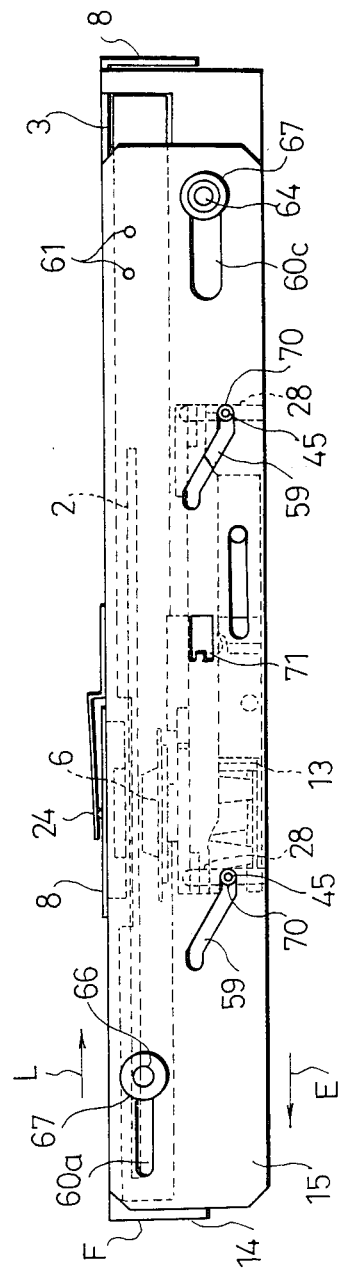

DISC DRIVING DEVICE

BACKGROUND OF THE INVENTION

1. Field of the Invention

This invention relates to a disc driving device for recording and or reproducing information by rotating and driving an information recording medium which is formed into a disc, and particularly to a disc driving device suitable for an optical recording medium.

2. Description of the Prior Art

An optical disc driving device usually employs an auto-loading mechanism which introduces an information recording medium (hereinafter referred to as a disc) placed on a tray into the device along with the tray to provide recording and reproducing. A conventional optical disc driving device of this kind is shown in FIGS. 26 and 27. FIG. 26 is a sectional view showing the unloading state wherein a tray of a conventional optical disc driving device is moved out of the device body; and FIG. 27 is a sectional view showing the loading state wherein the tray is received into the device body.

Referring to FIG. 26, an optical disc driving device 1 is principally composed of a tray 3 which receives a disc 2 through a sub-tray 4 later described and which horizontally moves in and out of the device, a drive means (not shown) for moving the tray 3 into and out of the device, the sub-tray 4 on which the optical disc 2 is placed within the tray 3 and movable up and down, a means for lifting (not shown) the sub-tray 4, a turntable 6 provided with a raised portion 5 which is inserted into a central circular hole of the disc 2 to rotate and drive the disc 2, a motor for rotating and driving the turntable 6, a clamper 8 for pressing a portion in the vicinity of the central hole of the optical disc with respect to the turntable 6, an arm 9 for vertically turning the clamper 8, a pick-up 10 for recording/reproducing of the optical disc 2, a guide rail 11 for guiding the pick-up 10 in a radial direction of the optical disc 2, and a linear motor (not shown) for moving the pick-up 10 along the guide rail 11.

The above-described optical disc driving device 1 is operated in a manner as follows:

First, as shown in FIG. 26, in the unloading state, the optical disc 2 is placed on the sub-tray 4 within the tray 3. Then, the tray 3 is pulled into the device 1 by the drive means not shown, upon completion of which pulling-in, the sub-tray 4 moves down toward the turntable 6. During the downward movement of the sub-tray 4, the optical disc 2 remains placed on the turntable 6, and at the position slightly distanced from the optical disc 2 the sub-tray 4 finishes its downward movement. During the downward movement of the sub-tray 4, the clamper 8 is also moved down to press the optical disc 2 against the turntable 6.

Thus, the device assumes the loading state as shown in FIG. 27, whereby the optical disc 2 rotates and the pick-up 10 is moved in the radial direction of the optical disc 2 along the guide rail 11 by means of a near motor (not shown) to record or reproduce the optical disc 2.

Upon termination of recording or reproducing of the optical disc 2, the clamper 8 moves upward and the sub-tray 4 also moves upward whereby the optical disc 2 is released from the turntable 6 to project the tray 2 thus returning the unloading state shown in FIG. 26 to remove the optical disc 2.

In the above-described optical disc driving device, it is necessary to move the sub-tray 4 and clamper 8 upward and downward, and therefore various driving mechanisms are provided. Particularly, the sub-tray 4 has to be positioned away from the turntable 6 and pick-up 10 and to place the optical disc 2 in a stabilized fashion. In addition, they should be accommodated within the tray 2 including the lifting means, thus the mechanism becomes complicated. Moreover, the clamper 8 is moved up and down by the turning arm 9, and therefore a stroke occupying area thereof increases, and a complicated vertically turning mechanism is provided.

As described above, the sub-tray 4 and the clamper 8 causes the mechanism of the optical disc driving device 1 to be complicated and besides gives rise to a factor impairing formation of the device into a reduced thickness. This reduction in thickness is necessary in order that for example, an optical disc device is provided in place of a unit of a floppy disc device on a personal computer of a floppy disc encased type.

SUMMARY OF THE INVENTION

This invention has been achieved in view of the problems noted above with respect to prior art. An object of the invention to provide a disc driving device which can be made into a thinner form of the device.

For achieving the aforesaid object, the invention provides a disc driving device which introduces a disc-like information recording medium to effect recording and or reproducing of an information, the device comprising a turntable for rotating and driving the information recording medium, a supporting member having a projection on the side end thereof to support the turntable, a tray provided with a rack and on which the information recording medium is placed, a chassis provided with a guide groove wherein the projection of the supporting member is fitted into a side plate formed vertically on the whole with respect to the rotating surface of the turntable, said chassis slidably supporting the tray, a tray driving means provided with a train of gears meshed with said rack to charge the tray to a loading position within the chassis and discharge it to an unloading position, a slide plate provided with a cam groove into which the projection of the supporting member is fitted and supporting the supporting member movably along the guide groove by the cam groove in the state wherein the projection is inserted into the guide groove, a driving means of the slide plate for reciprocating the slide plate along the side plate of the chassis, and a clamper rotatably mounted at a position opposed to the turntable of an upper plate of the chassis.

In accordance with the aforementioned arrangement, when the tray having the information recording medium placed thereon is introduced to the loading position within the chassis and the medium on the tray reaches a predetermined position of the turntable, the supporting member supporting thereon the turntable moves upward toward the medium to separate the medium from the tray to urge it against the clamper on the upper surface side of the chassis and clamp it by the clamper and the turntable thereby making it possible to load the medium.

That is, when the tray arrives at the aforesaid predetermined position, the operation of introducing the tray to the loading position stops and at the same time the means for driving the slide plate initiates its operation. When the slide-plate driving means is actuated, the slide plate is moved for example in the same direction as the direction of introducing the tray, and upon this movement, there is applied a force in a direction of pushing up the projection of the supporting member along the cam groove. At that time, the projection is in engagement with the guide groove formed vertically on the whole with respect to the rotating surface of the turntable, and therefore the supporting member is displaced toward the clamper along the guide groove to move the medium from the turntable thus making it possible to hold the medium between the turntable and the clamper.

In unloading, the operation reverse to the above operation is carried out to move the tray in the direction of ejecting it from the chassis to project the medium place portion exteriorly of the chassis. Thereby the medium may be removed from the tray.

BRIEF DESCRIPTION OF THE DRAWINGS

FIGS. 1 through 25 illustrate preferred embodiments according to the present invention; in which FIG. 1 is a plan view of an optical disc driving device in a state where loading is completed.

FIG. 2 is a bottom view of the device,

FIG. 3 is a front view of the device,

FIG. 4 is a front view of an optical disc driving device showing a state wherein a tray is at a loading position and a small frame is at an unloading position, FIG. 5 is a side view of an optical disc driving device in a state wherein loading is completed, FIG. 6 is a plane view of essential parts of the small frame.

FIG. 7 is a side view of the small frame,

FIG. 8 is a plan view of a side base,

FIG. 9 is a front view of the side base,

FIG. 10 is a plan view of a chassis,

FIG. 11 is a front view of the chassis,

FIG. 12 is a side view of the chassis,

FIG. 13 is a plan view of a tray,

FIG. 14 is a sectional view taken on line A—A of FIG. 13, FIG. 15 is a front view of a lock pin, FIGS. 16 to 20 respectively illustrate the operation of introducing the tray, and FIGS. 21 to 25 respectively illustrate the operation of a motor unit.

In the following description, elements similar to or corresponding to those of prior art are indicated by the same reference numerals.

DESCRIPTION OF THE PREFERRED EMBODIMENTS

Figure 1:
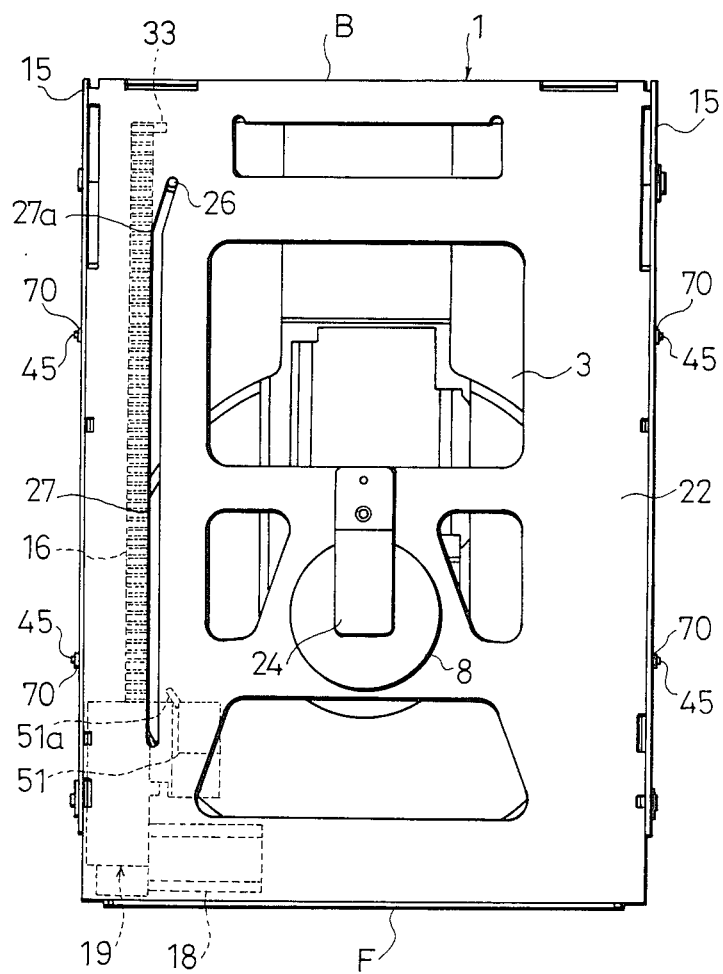

First, the schematic construction of the device will be described with reference to FIGS. 1 to 15. An optical disc driving device 1 is principally composed of a chassis 12, a tray 3, a small frame 13 including a frame portion 13a supporting a turntable 6, a motor 7 for rotating and driving the turntable 6 and a pickup 10 and a side base 13b projected from the frame portion 13a, slide plates 15 disposed on opposite sides of a side (a side plate) 14 of the chassis 12, a rack 16 disposed on the lower surface (in FIG. 13) of the tray 3, a motor unit 19 including a train of gears 17 meshed with the rack 16 and a motor 18 for rotating and driving the train of gears 17, and a clamper 8 disposed at a position opposed to the turntable 6 on the upper surface of the chassis 12, etc.

Figure 10:
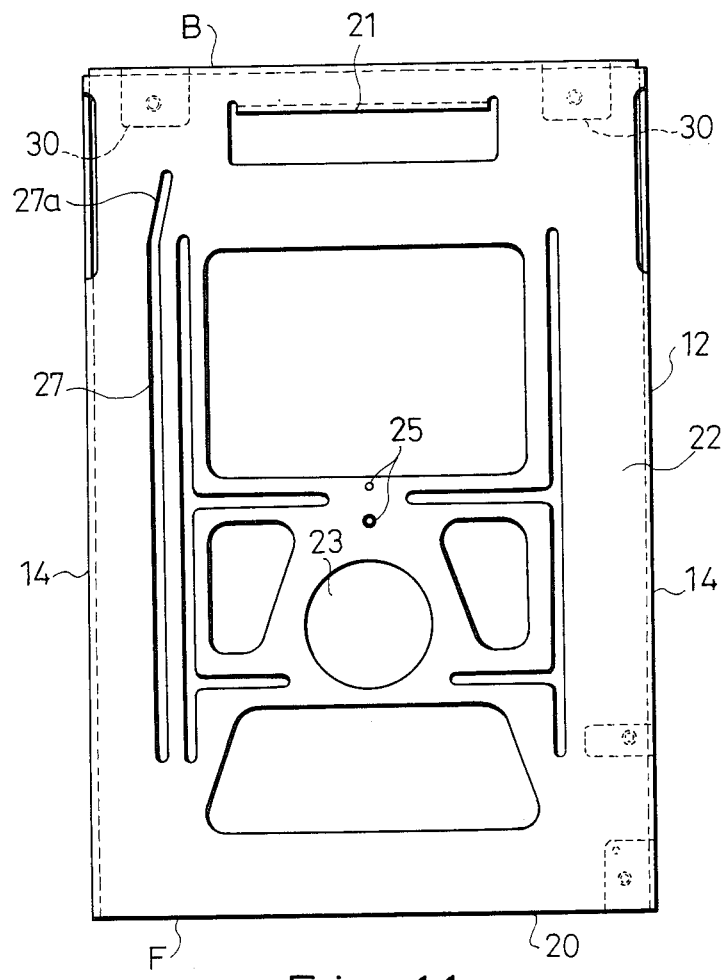
Figure 11:
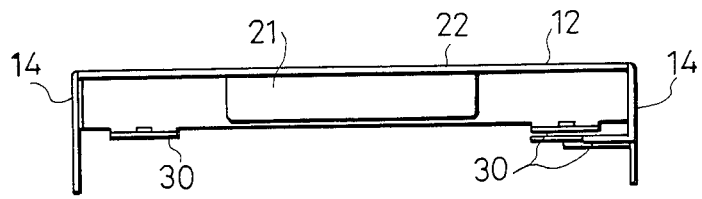

Next, the construction of various parts will be described. As shown in FIGS. 10 and 11, the chassis 12 is formed in such a manner that a metal sheet is bent into a ⊐-shape in section on the whole a lower side of which is opened. In FIG. 10, a lower portion comprises an introducing and discharging opening 20 (hereinafter the side of the opening 20 called the front portion F and the side of the counter-introducing and discharging opening called the rear portion B) of the tray 3. At the rear portion B, a stopper 21 for defining the final introducing position of the tray 3 is suspended, and at the position opposed to the turntable 6 of the upper plate 22 of the chassis 12 are formed an inserting hole 23 for the clamper 8 and a mounting portion 25 of a clamp spring 24 for resiliently supporting the clamper 8. On the left side as viewed on the side of the opening 20 of the upper plate 22 is formed a guide groove 27 by which a lock pin 26 later described is guided. A slightly bended portion 27a is provided on the rear portion B portion, and the position of the lock pin 26 is set so as to be slightly deviated from the tray inserting direction.

Figure 12:
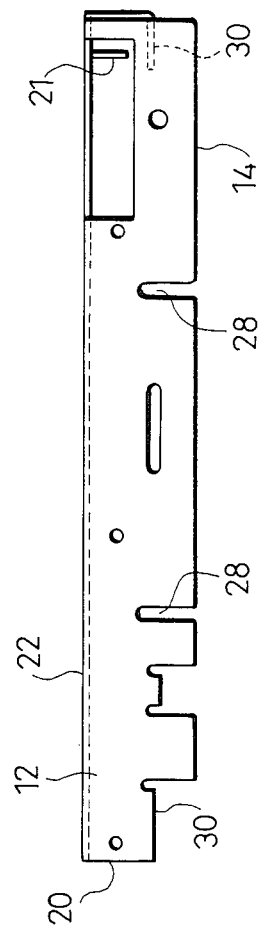

On the side (hereinafter referred to as a side plate) composed of two side plates suspended from the upper plate 22 of the chassis 12 are formed two guide grooves 28 which are vertical on the whole on the side of the upper plate 22 from the lower open end as shown in FIG. 12, and a mounting portion 30 of a vibration-proof rubber 29 is provided on the introducing and discharging opening 20 and counter-introducing and discharging opening of the tray 3.

Figure 13:
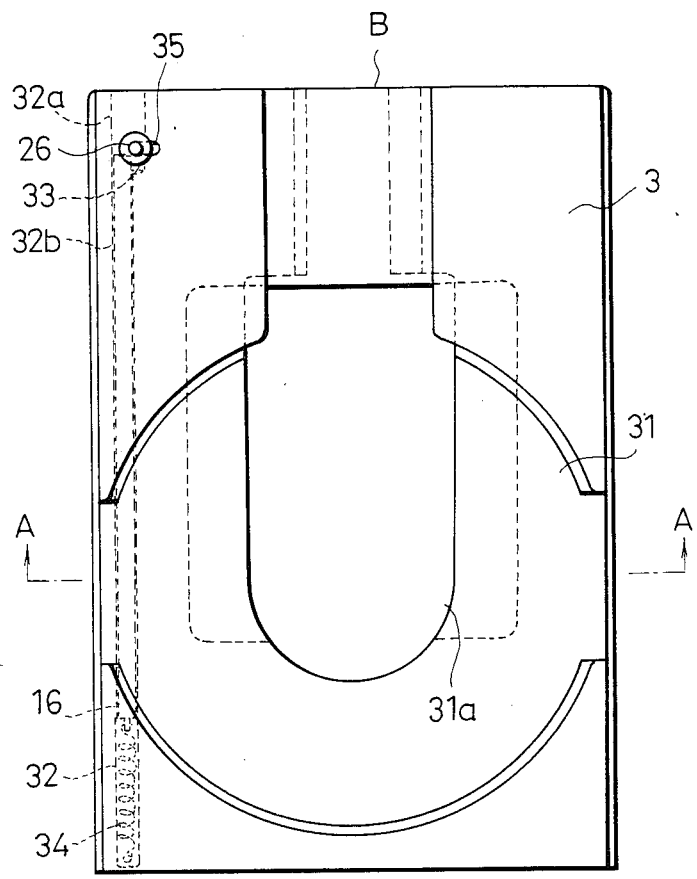

As shown in FIG. 13, the tray 3 is provided with a place portion 31 in the form of a recess on which the optical disc 2 is placed in the central portion of the upper surface, and a turntable receiving hole 31a is opened in the center into which the upwardly moved turntable 6 is inserted, as shown in FIG. 13. In the lower surface of the tray 3 is formed a rack mounting groove 32 into which is slidably fitted a rack 16 which is operatively connected to the tray 3 to introduce to and discharge from a predetermined loading position of the chassis 12.

Figure 14:
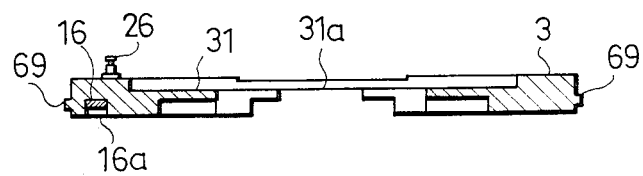

As shown by the phantom outline in FIG. 13, the rack 16 is formed with a projection 33 projected upwardly in FIG. 13, that is, on the side of the rear portion B and sideways, and the rack mounting groove 32 is also formed with a widened portion 32a on the side of the rear portion B of the tray 3, the projection 33 of the rack 16 being set so as not to be moved toward a narrow portion 32b. The rack 16 is always urged against the front portion F of the tray 3 by means of a tension spring 34 within the rack mounting groove 32. A lock pin receiving hole 35 into which a lock pin 26 later described is loosely inserted is formed in the tray 3 on the rear end of the projection 33 of the rack 16 so that the hole 35 is directed vertical to the rack mounting groove 32. The rack 16 has a tooth portion 16a exposed to the lower surface of the tray 3 as shown in FIG. 14.

Figure 2:
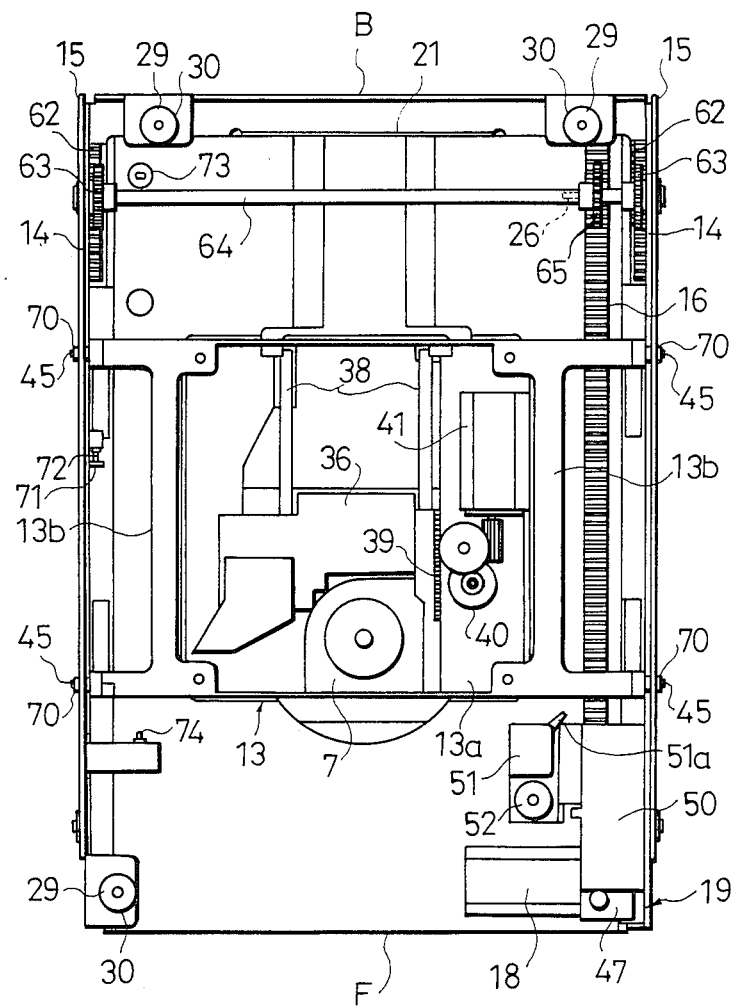
Figure 3:
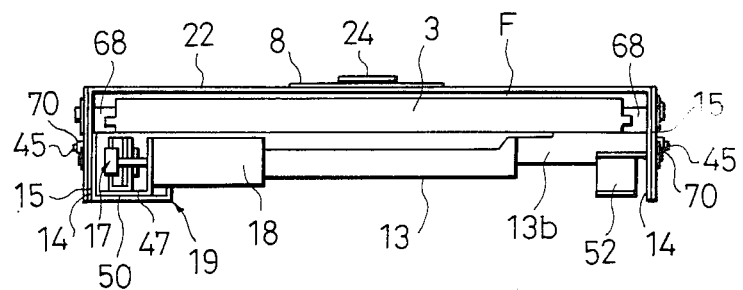
Figure 6:
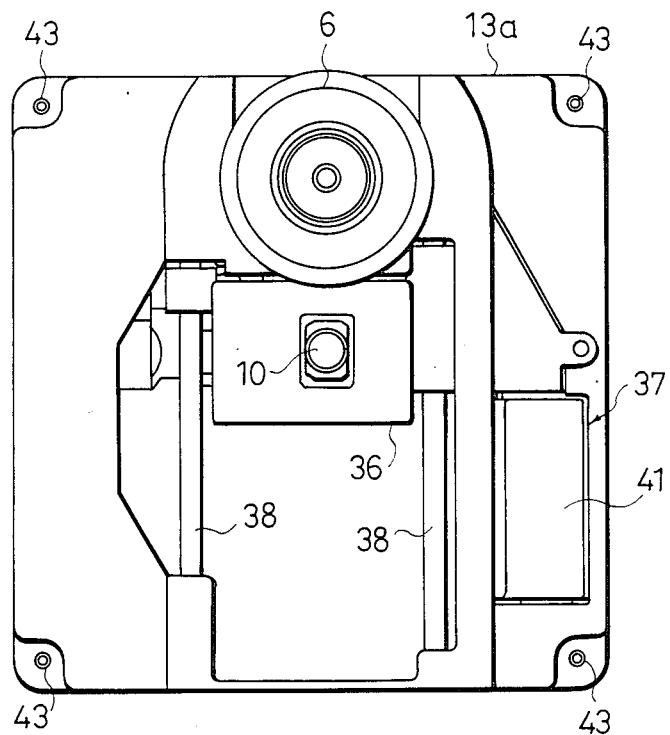
Figure 7:
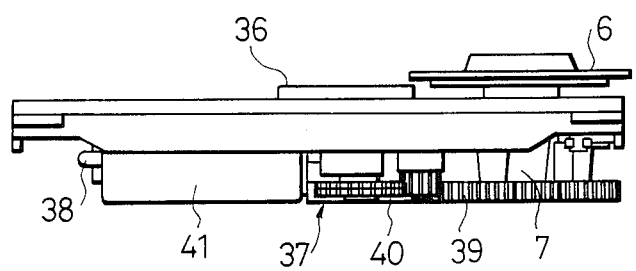
Figure 8:
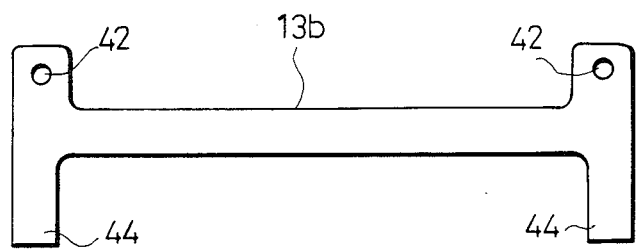
Figure 9:
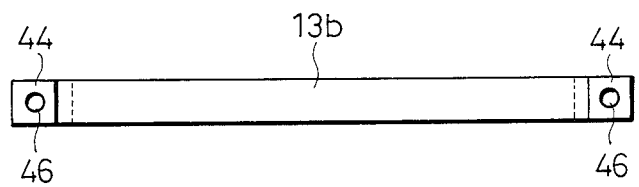

The small frame 13 consists of a frame portion 13a and a side base 13b as shown in FIG. 2. Mounted on the frame portion 13a are a motor 7 for rotating and driving the turntable 6, a carriage 36 having a pick-up 10 carried thereon, and a carriage driving mechanism 37 for transporting the pick-up 10 in a radial direction of the optical disc 2, as shown in FIGS. 2, 6 and 7. The carriage driving mechanism 37 comprises a pair of guide rods 38 for guiding the carriage 36, a train of gears 40 meshed with a rack formed on the side of the carriage 36, and a motor 41 for rotating and driving the train of gears 40, these elements being disposed on the lower surface of the frame portion 13a. The side base 13b is formed into an H-shape as the whole as shown in FIGS. 8 and 9. Tapped holes 42 are utilized so that a pair of side bases 13b are screwed into mounting holes 43 of the frame portion 13a. Thereby, projected portions 44 of the side base 13b are extended toward the side plate 14 of the chassis 12. The end of the projected portion 44 is formed with a mounting hole 46 into which is fitted a roller pin 45 which functions as a projection.

Figure 21:
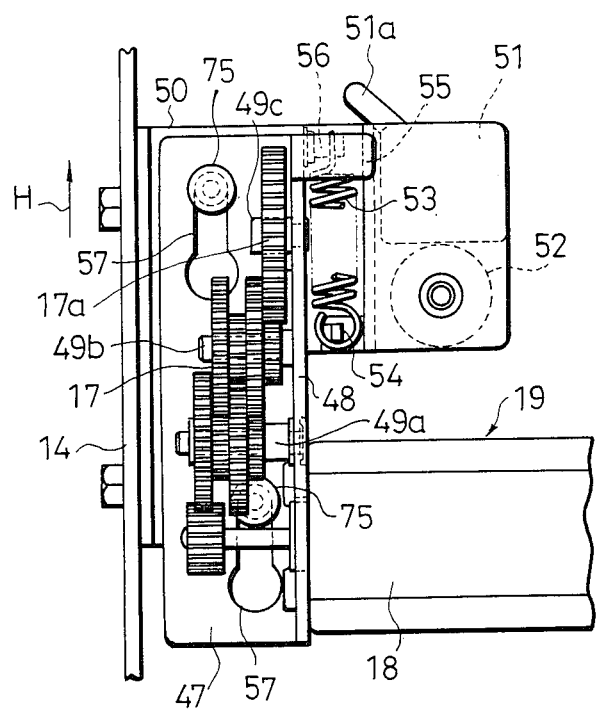
Figure 22:
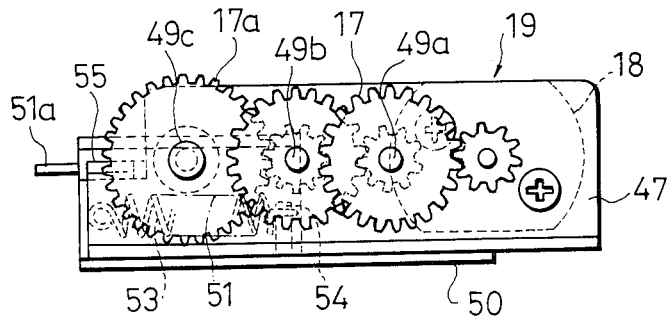
Figure 23:
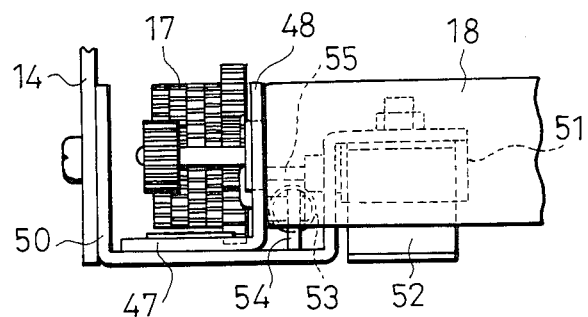

The motor unit 19 is principally composed of a motor 18 mounted on a side plate 48 of a slide member 47 in the form of an L-letter in section, a train of gears 17 rotatably mounted on support shafts 49a, 49b and 49c, respectively, stood upright on the side plate 48, and a supporting plate 50 slidably supporting the slide member 47. On the supporting plate 50 are mounted a lever type switch 51 and a vibration-proof rubber 52 and is stood upright an engaging member 54. A contact member 55 in contact with a lever 51a of the switch 51 and an engaging member 56 are extended from the slide member 47, and a tension spring 53 is extended between the members 54 and 56. Thereby the slide member 47 is always urged downwardly (in the direction of the front portion F) in FIG. 21, position of which is defined by the guide groove 57 of the slide member 47.

Figure 5:
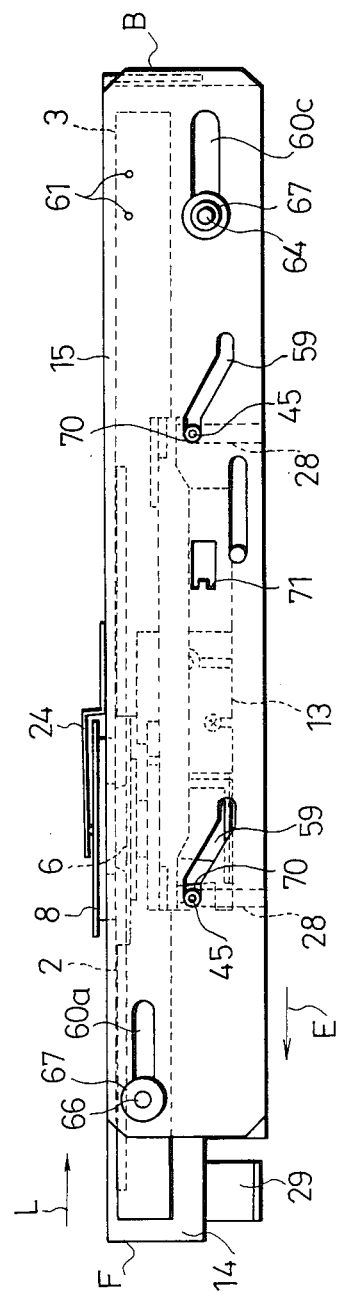

The clamper 8 is mounted on the upper plate 22 of the chassis 12 so that the clamper 8 may be urged against the turntable 6 as shown in FIGS. 1 and 5 and is rotatable at said mounting position.

Figure 15:
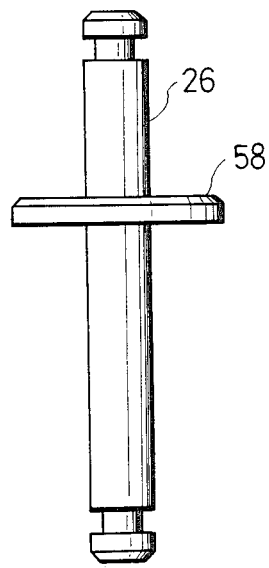

The lock pin 26 is formed at the central upper portion with a collar 58 as shown in FIG. 15, and a portion thereof above the collar 58 is projected toward the tray 3 and loosely fitted into the guide groove 27 of the upper plate 22 of the chassis 12 so that the lock pin 26 is moved along the guide groove 27.

The slide plate 15 is prepared in the paired form each being located externally of the side plate 14 chassis 12, and as shown at the righthand of FIG. 5, there are formed a cam groove 59 into which is fitted a roller pin 45 provided on the end of the side base 13b of the small frame 13, and guide grooves 60a and 60c defining horizontal position with respect to the upper plate 22 of the chassis 12. The cam groove 59 is formed to be upwardly inclined toward the front portion F of the chassis 12, and the roller pin 45 is moved in contact with the inner surface of the cam groove 59 in response to the reciprocating movement of the slide plate 15. A small hole 61 bored in the upper portion of the rear portion B is provided to mount a rack 62 for driving the slide plate shown in FIG. 2.

A pinion 63 shown in FIG. 2 is meshed with the rack 62, the pinion 63 being mounted rotatably integral with a rotational shaft 64 which is inserted into the guide groove 60c on the rear portion B side. A pinion 65 meshed with the rack 16 is likewise mounted on the rotational shaft 64.

Next, the whole structure will be described. In the optical disc driving device 1 constructed as described above, the slide plate 15 is mounted on the outer surface of the side plate 14 of the chassis 12 through an E-washer 67, for example, by the rotational shaft 64 and the pin 66, as shown in FIGS. 1 to 3 and 5, and the slide plate 15 is slidably moved in the range of the length of the guide grooves 60a and 60c.

On the inner surface of the side plate 15 of the chassis 12 is disposed a pair of guide rails 68 from the introducing and discharging opening 20 of the tray 3 to the rear portion B, and a projecting element 69 on the side of the tray 3 is slidably inserted into the groove of the guide rail 68, the tray 3 being set so that it may merely be reciprocated along the guide rail 68.

In FIG. 1 showing the opening 20 of the tray 3 of the chassis 4, that is, on the side plate on the left side as viewed from the front portion F is mounted the motor unit 19 through the supporting plate 50 with the motor 18 arranged on the front portion F. A final gear 17a of the gear train 17 of the motor unit 19 is meshed with the rack 16 thereby making it possible to drive the tray 3 and the slide plate 15. The small frame 13 is fitted into the guide groove 28 of the side plate 14 of the chassis 12 and the cam groove 59 through the roller pin 45 at the end of the side base 13b and is held between both the slide plates 15. A roller 70 is rotatably mounted on the end of the roller pin 45 so that the roller 70 rolls within the cam groove 59 to relieve the operating force of the slide plates 15. With the above-described structure, the rack 16 is driven through the motor 18 to provide the reciprocating movement of the tray 3 and the lifting operation of the small frame 13. In addition, the pick-up 10 may be transported by the motor 41, and the optical disc 2 may be rotated and driven by the motor 7.

Loading and ejecting operation

Figure 16:
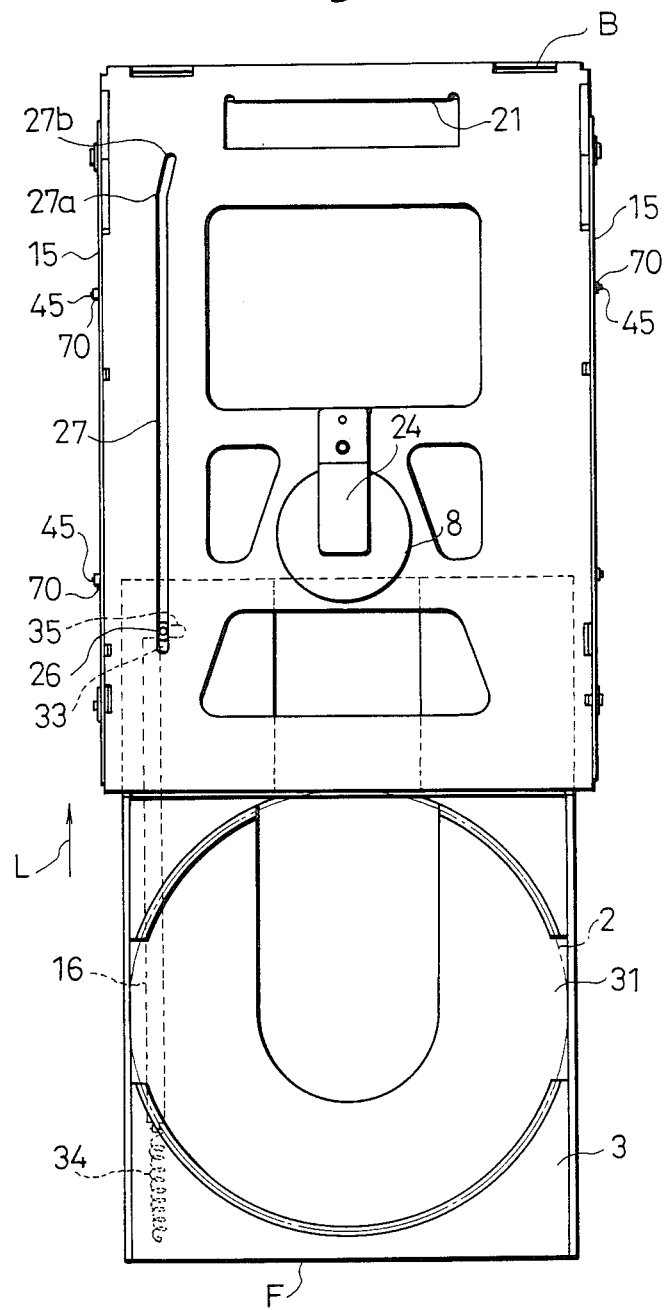
Figure 17:
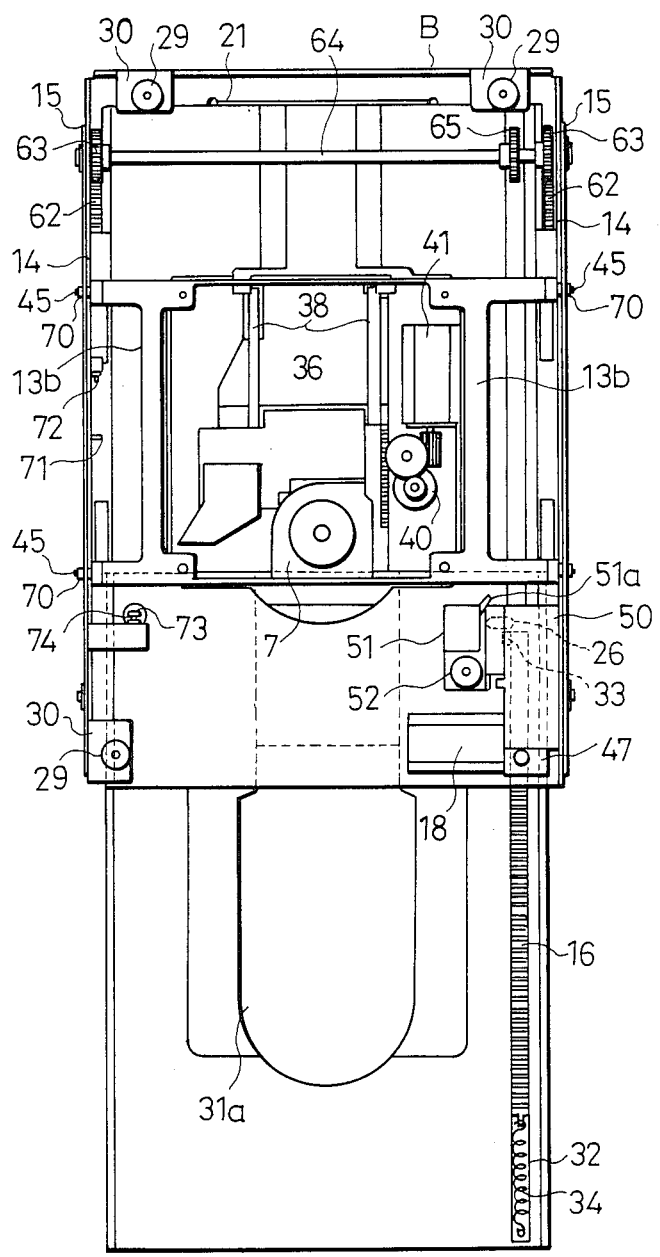

FIGS. 16, 17 and 19 show the state where the tray 3 is drawn from the chassis 12 and the optical disc 2 is placed on the place portion 31. When the loading switch on the controller side not shown is turned on, the motor 18 is driven to rotate the gear train 17. The final gear 17a causes the rack 16 to be driven in a direction as indicated by arrow L. Since the end of the projection 33 forming portion of the rack 16 is in abutment with the lock pin 26 inserted into a straight line portion of the guide groove 27 and being positioned on the left side in FIG. 16 of the lock pin receiving hole 35, the driving force in the direction of arrow L applied to the rack 16 is transmitted to the tray 3 through the lock pin 26. Thereby, the tray 3 is moved integral with the rack 16 in the direction of arrow L and introduced into the chassis 12. While in this embodiment, the tray 3 is driven through the lock pin 26, it is noted that the spring constant of the tension spring 34 is suitably selected to thereby omit the lock pin 26.

Figure 4:
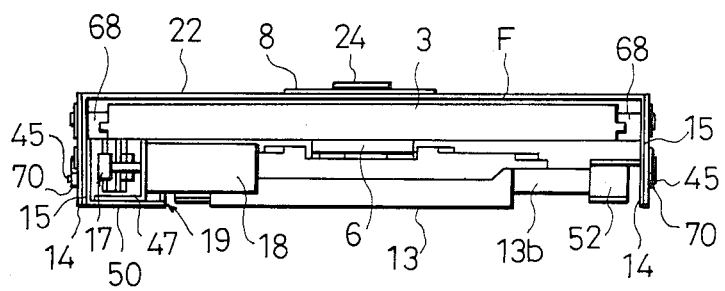
Figure 18:
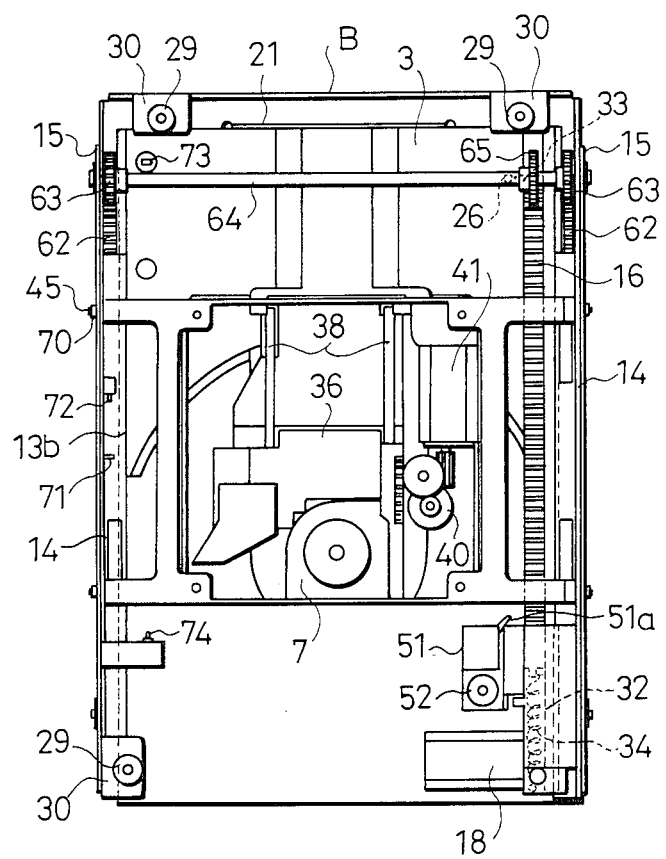

When the tray 3 is moved in the direction of arrow L and the lock pin 26 reaches the bended portion 27a of the guide groove 27, the lock pin 26 is guided by the bended portion 27a to be moved leftward of the lock pin receiving hole 35. At that time, the end of the projection 33 remains contacted with the lock pin 26, and the tray 3 integral with the rack 16 moves to a predetermined loading position shown in FIGS. 18 and 20. Then, when the tray 3 reaches the loading position, the lock pin 26 reaches the distal end 27b of the bended portion 27a to assume the position at the right end of the lock pin receiving hole 35. At that time, the small frame 13 remains positioned under the chassis 12 as shown in FIG. 4 and is in the unloading state with respect to the optical disc 2. When the lock pin 26 is positioned at the right end of the lock pin receiving hole 35, the abutment of the rack 16 against the lock pin 26 of the projection 33, namely, locking is released as shown in FIG. 18. At this position, the tray 3 abuts against the stopper 21 of the chassis 12 and becomes immovable. Accordingly it further moves in the direction of arrow L against the force of the tension spring 34.

When the rack 16 is unlocked and only the rack 16 starts moving, the rack 16 meshes with the pinion 65 as shown in FIG. 18 to rotate the rotational shaft 64. When the shaft 64 is rotated, the pinion 63 mounted on the opposite ends of the shaft 64 also rotates therealong to move the slide plate driving rack 62 meshed by the pinion 63 in the same direction of arrow L as that of the rack 16. Since the rack 62 is mounted integral with the slide plate 15, the slide plate 15 also moves in the direction of L to the position shown in FIG. 5 from that shown in FIG. 20.

When the slide plate 15 is moved in the direction of arrow L, the roller 70 of the roller pin 45 projected from the small frame 13 is obliquely and upwardly pushed by the cam groove 59. Since this roller 70 is also inserted in the guide groove 28 of the side plate 14 of the chassis 12, the roller 70 which is moved in contact with the cam groove 59 is to be raised toward the upper plate 22 of the chassis 12 along the guide groove 28. With this, the small frame 13 is also moved upward toward the clamper 8, and during upward movement, the turntable 6 causes the optical disc 2 to raise the optical disc 2 toward the clamper 8. When the roller 70 reaches the upper end of the cam groove 59, the optical disc 2 is held between the clamper 8 and the turntable 6 by the force of the clamper spring 24 in the state where the disc 2 is parted from the place portion 31 of the tray 3. At this very position, the projection projected from the slide plate 15 toward the chassis 12 abuts against the sensor 72 as shown in FIG. 2. The motor 18 stops its rotation by the signal from the sensor 7 to terminate the loading of the optical disc 2 from the FIG. 4 state to the FIG. 3 state. Thereafter, when the play button is depressed, the motor 7 rotates and the motor 41 of the carriage transporting mechanism 37 is driven to transport the pick-up 10 to the desired track position for recording or reproducing.

After termination of recording or reproducing, when the eject switch on the controller side not shown is turned on, the motor 18 rotates in a direction opposite to that of loading. With this, the rack 16 moves in the direction of arrow E to move the slide plate driving rack 62 in the direction of arrow E through the pinions 65 and 63 by the reversed operation. As the rack 62 moves, the slide plate 15 is also returned to the direction of arrow E, and the small frame 13 is also moved downward by the engagement between the roller pin 45, the cam groove 59 of the roller 70 and the guide groove 28, thus returning to its initial position. When the small frame 13 is moved down, the turntable 6 naturally moves down and moves back to the lower surface of the tray 3 with the optical disc 2 left at the place portion 31 of the tray 3.

At that time, the projection 33 of the rack 16 abuts against the end 32c on the side of the narrow portion 32b of the widened portion 32a of the rack mounting groove 32, and the tray 3 starts moving integral with the rack 16 in the direction of arrow E. When the tray 3 is projected to the position shown in FIG. 17 by the driving force of the motor 18, the pin 73 suspended on the lower surface of the tray 3 abuts against the sensor 74, and the motor 18 stops by the signal from the sensor 74 to complete the ejecting operation. The optical disc 2 may be removed from the tray 3 at that position.

Operation of the motor unit

It is considered during the above-described ejecting operation that the tray 3 being ejected from the chassis 12 possibly abuts against any obstacle including human being. If the tray 3 should impinge upon an obstacle, the driving force for driving the tray 3 in the direction of arrow E is applied from the motor 18 to the tray 3 while the tray 3 remains stopped or remains being applied with a force by which the latter is forced toward the chassis 12. With such a state as described above, there possibly poses troubles such as overheat of motor 18, incomplete engagement between the rack 16 and the gear 17a, defects of teeth of the gears within the gear train 17, incomplete engagement of gears, etc. If things come to the worst, the loading ejection possibly becomes disabled.

To avoid this, the optical disc driving device according to this embodiment has employed the motor unit 19 constructed as described above. More specifically, the motor unit 19 is formed in a manner such that the slide member 47 having the gear train 17 meshed with the rack 16 and the motor 18 for driving the gear train 17 is mounted on the supporting plate 50 so that the former may be slidably moved at least through a length of the guide groove 57. Then, the supporting plate 50 is mounted on the side plate 14 of the chassis 12. The tension spring 53 is stretched between the supporting plate 50 and the slide member 47 as described above. Normally, the end of the rear portion B of the guide groove 57 abuts against the pin 75 secured to the supporting plate 50. In this state, the abutment element 55 of the slide member 47 is withdrawn to the position wherein the lever 51a of the switch 51 is not operated.

Figure 24:
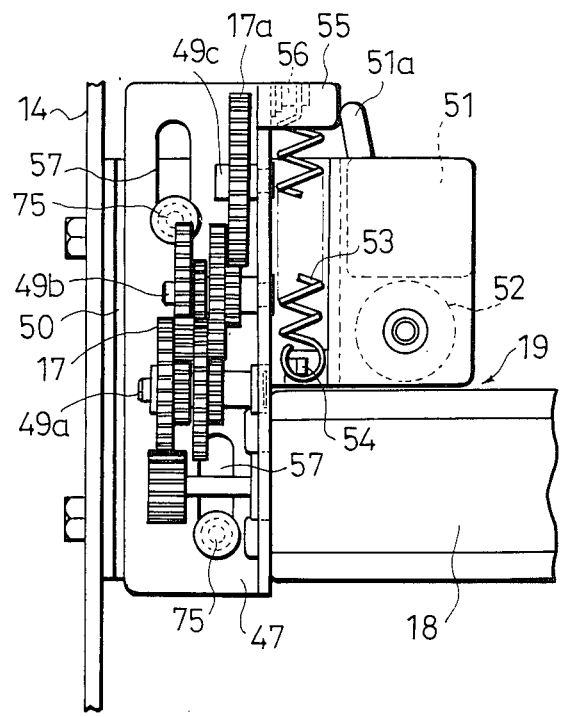
Figure 25:
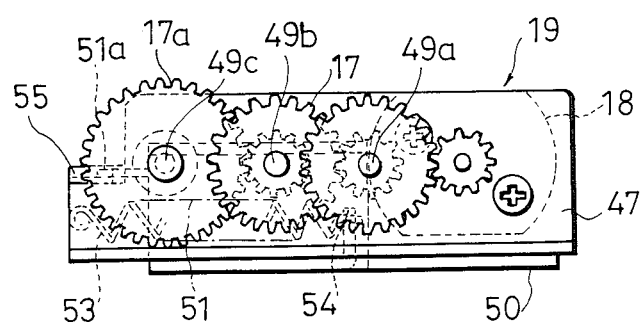
Figure 26:
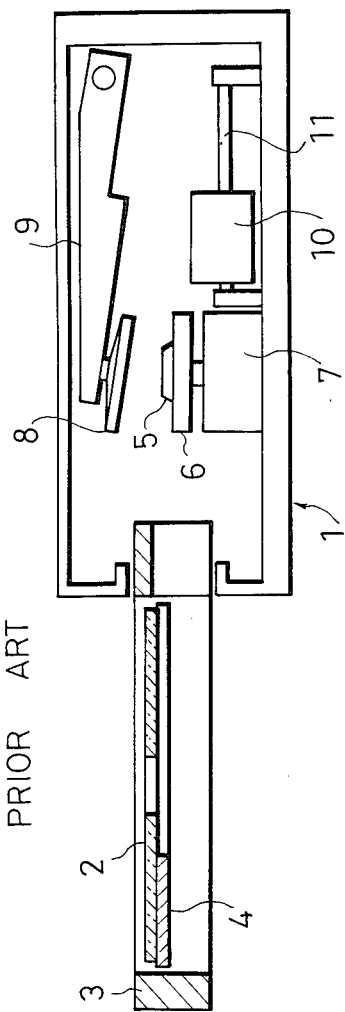
FIGS. 26 and 27 are respectively schematic sectional views of a conventional optical disc driving device.
Figure 27:
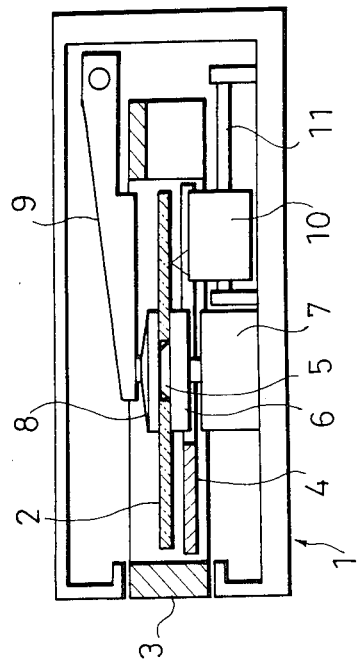

It is assumed that in the aforesaid state, the tray 3 abuts against any obstacle when the final gear 17a meshes with the rack 16 to eject the tray 3. Then, the tray 3 stops, and the rack 16 naturally stops its movement. On the other hand, the motor 18 keeps its rotation. When the motor 18 rotates when the rack becomes disabled, the turning force of the motor 18 functions to move the gear 17a to move along the teeth 16a of the rack 16 in accordance with the action and reaction law, whereby the gear train 17 and the slide member 47 supporting the motor 18 are moved in the direction of arrow H against the force of the tension spring 53. Then, as shown in FIGS. 24 and 25, the abutment element 55 rotates the lever 51a of the switch 51 clockwise as shown. The switch 51 detects the rotation of the lever 51a to switch the contact to reverse the motor 18. When the motor 18 is reversed, the tray is moved in the ejecting direction, that is, from the direction of arrow E to the loading direction, that is, the direction of arrow L, to prevent the aforesaid trouble from occurrence.

Lock pin

The lock pin 26 is provided to provide positive operation of introducing the tray 3 and to prevent erroneous operation between the introducing operation and operation of upward movement of the small frame 13.

More specifically, in the case where the aforementioned optical disc driving device 1 is constituted without provision of locking means for the rack 16 such as the lock pin 26, when for example the operator stops the tray 3 by hands during the movement of the former in the loading direction or pulls it back, only the rack 16 is moved in the direction of arrow L against the force of the tension spring 34. When the rack 16 assumes the position where the rack 16 meshes with the pinion 65, the pinion 63 is driven to move the slide plate 15. By the movement of the slide plate 15, the frame 13 is moved upward despite the fact that the tray 3 is not in the loading position. Therefore, the turntable 6 abuts against the recording area of the optical disc 2 to press the latter, thus possibly breaking the information recorded in the optical disc 2 or abutting against a part of the tray 3 to damage the latter.

In the case where the tension spring 34 is degraded to fail to secure the required spring force, the rack 16 alone is introduced at the time of loading, and the small frame 13 is moved upward despite the fact that the tray 3 is not in the loading position, which possibly leads to the trouble similar to that as described above.

However, if an arrangement is made so that the lock pin 26 is introduced and after the tray 3 has reached the predetermined loading position, the lock pin 26 is unlocked, no malfunction as noted above occurs at all and the trouble of damages of the optical disc 2, tray 3, etc. may be avoided. The lock pin 26 is merely loosely inserted between the combined guide groove 27 and the lock pin receiving hole 35 so that the lock pin 26 locks the rack 16 in the widened portion 32a of the rack mounting groove 32 of the tray 3 and is disengaged from the end of the rack 16 when the tray 3 reached the loading position. Therefore, the cost of the lock pin is extremely low and the operation thereof is positive.

As described above, the aforementioned embodiment has various effects as follows:

(1) Neither of the mechanism for moving down the sub-tray 4 of the tray 3 and the mechanism for pivotally supporting the clamper 8 to press the optical disc 2 are required, and formation of a thinner optical disc driving device 1 may be facilitated.

(2) Since the lock pin 26 is introduced to define the integral and separating operation between the rack 16 and the tray 3, no possible malfunction occurs. No possible trouble occurs in the recording medium and disc driving device due to the malfunction. Thereby the reliance of the disc driving device may be enhanced.

(3) The detection and control means for mechanically detecting the trouble when the tray 3 is ejected to reverse the tray 3 in the loading direction comprises the mechanical motor unit 19. Therefore, the optical disc driving device may be produced at less cost.

As will be apparent from the foregoing, according to the present invention in which the turntable is moved upward toward the clamper to separate the recording medium in the unloading position from the tray to hold it between the turntable and the clamper for rotation, none of the sub-tray, the mechanism for moving down the sub-tray, the mechanism for moving down the clamper, etc. are required. Therefore, formation of a thinner disc driving device may be achieved.

What is claimed is:

1. A disc driving device for recording and reproducing information from a recording disk medium, comprising:

a chassis having a front portion for inserting a tray containing a recording disk horizontally along a tray insertion path in a longitudinal direction into said chassis toward a rear portion thereof, a pair of side portions spaced on opposite sides of said tray insertion path in a lateral direction of said chassis perpendicular to the longitudinal direction, and upper and lower portions spaced on opposite sides of said tray insertion path in a vertical direction of said chassis;

a supporting member disposed on said lower portion of said chassis and being movable upward in the vertical direction of said chassis, said supporting member having a projection projected in the lateral direction toward one side portion of said chassis, wherein said one side portion of said chassis includes a vertical guide groove through which said projection projects and by which said supporting member is guided in its vertical movement;

a turntable supported on said supporting movement for vertical movement toward said upper portion of said chassis;

a clamper mounted to said upper portion of said chassis vertically over said turntable, wherein said turntable is vertically movable from below a loading position of said tray insertion path toward said clamper so as to clamp the recording disk in the tray inserted on said tray insertion path therebetween;

tray driving means including a longitudinal rack formed with said tray and a driving gear train in said chassis for driving said tray along said tray insertion path from an unloading position to said loading position in said chassis;

a slide plate disposed in parallel with said one side portion of said chassis and slidable along the longitudinal direction of said chassis, said slide plate having a cam groove formed therein in which said projection of said slide plate, projected through said guide groove of said one side portion, is engaged for moving said supporting member upward in the vertical direction in conjunction with sliding movement of said slide plate in the longitudinal direction; and slide plate driving means for driving said slide plate reciprocally in the longitudinal direction in order to clamp and unclamp the recording disk between said clamper and said turntable supported on said vertically movable supporting member.

2. The device according to claim 1, wherein said chassis has an open lower side and is formed from a metal sheet having a ⊐-shape 3. The device according to claim 1, wherein said tray is formed at a central portion on the upper surface thereof with a recess-like disc placement portion and has a turntable receiving hole in the center thereof, said tray being formed in the lower surface thereof with a rack mounting groove.

4. The device according to claim 3, wherein said tray has a lock pin formed in its central upper portion with a collar, and a portion above the collar is projected from the tray toward an upper plate of the chassis and is loosely fitted in a guide groove so that the lock pin is moved along the guide groove.

5. The device according to claim 1, wherein a small frame mounted in said chassis comprises a frame portion and a side base, said frame portion including a motor unit for rotating the turntable, a carriage for a pick-up loaded thereon and a carriage driving mechanism for transporting the pick-up in a radial direction of an optical disc.

6. The device according to claim 5, wherein a said motor unit comprises a motor mounted on a side plate of a slide member, a gear train on said side plate and a supporting plate for slidably supporting the slide member.

7. The device according to claim 1, wherein said slide plate is provided externally of the side plate of the chassis and formed with a cam groove to receive a roller pin and guide grooves for defining a horizontal position of the chassis relative to the upper portion.

* * * * *